March 8, 1966   H. GABLOFFSKY   3,239,672
PHOTOSENSITIVE MEANS FOR DETECTING THE POSITION
OF RADIATING OR REFLECTING BODIES
Filed Feb. 12, 1959   6 Sheets-Sheet 1

HEINZ GABLOFFSKY
INVENTOR.

BY Frederick M. Arbuckle
   agent
   Morris Spector
   ATTORNEY

March 8, 1966  H. GABLOFFSKY  3,239,672
PHOTOSENSITIVE MEANS FOR DETECTING THE POSITION
OF RADIATING OR REFLECTING BODIES
Filed Feb. 12, 1959  6 Sheets-Sheet 2
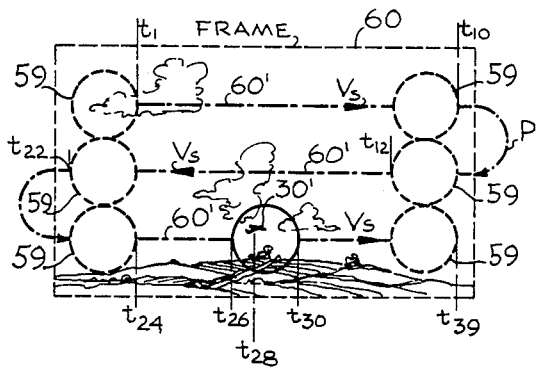
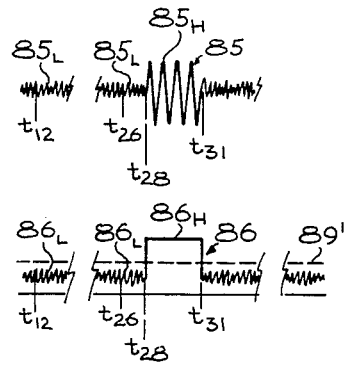
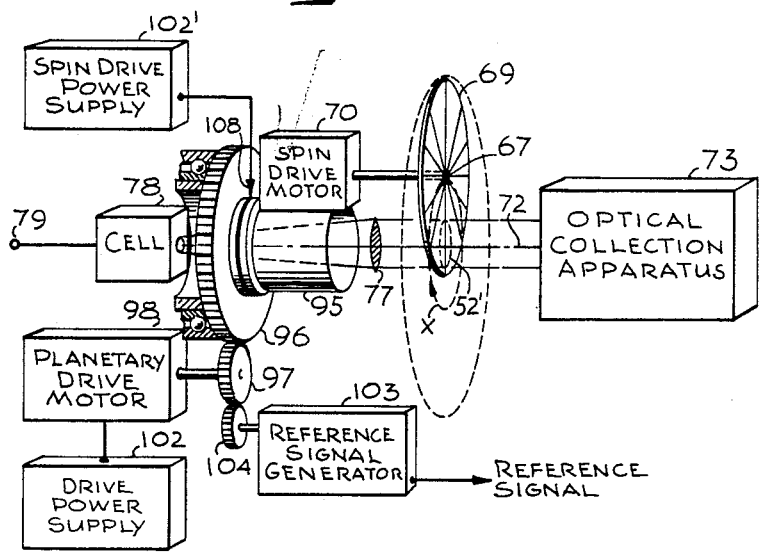
HEINZ GABLOFFSKY
INVENTOR.
BY
ATTORNEY

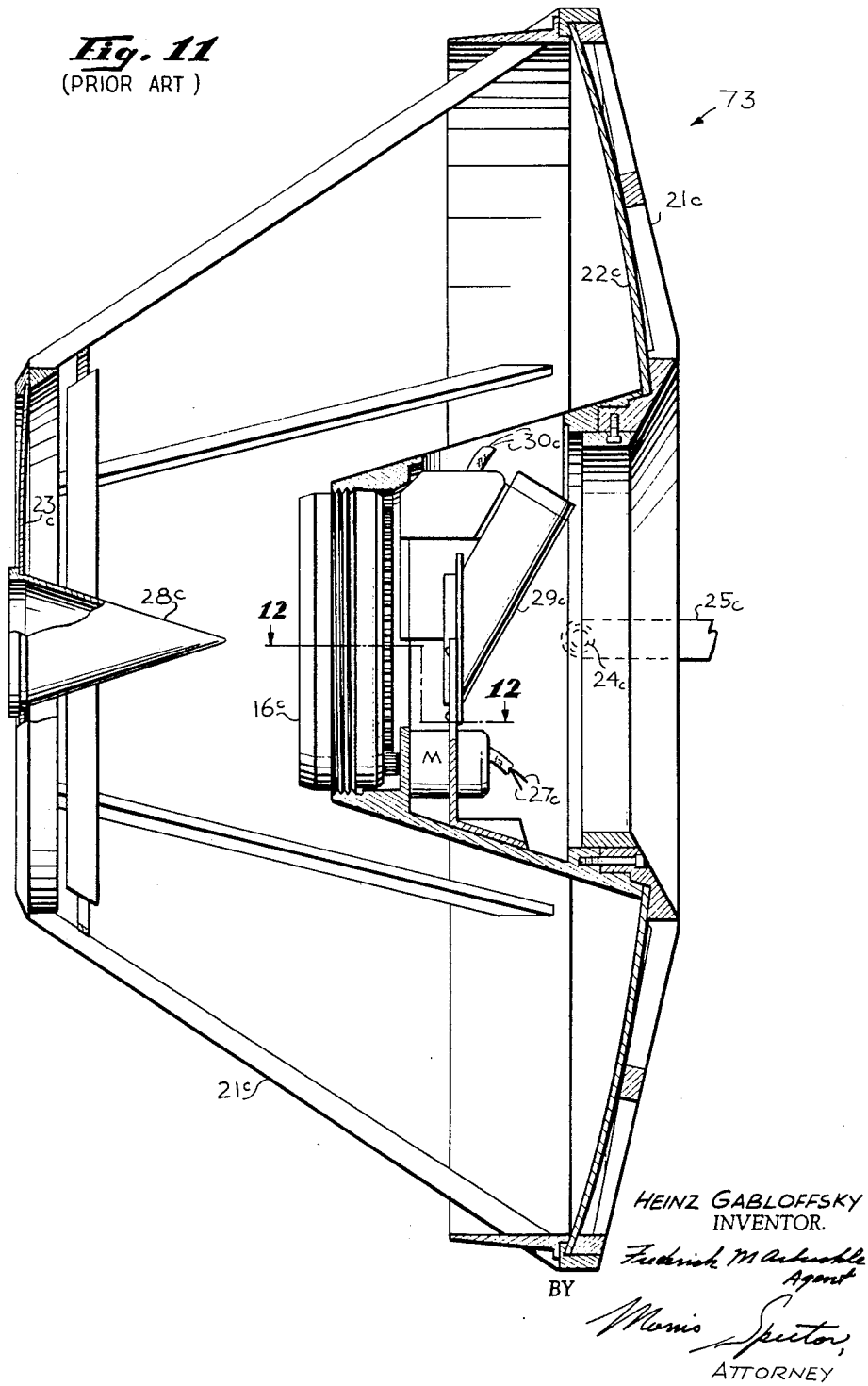

March 8, 1966 H. GABLOFFSKY 3,239,672
PHOTOSENSITIVE MEANS FOR DETECTING THE POSITION
OF RADIATING OR REFLECTING BODIES
Filed Feb. 12, 1959 6 Sheets-Sheet 5

HEINZ GABLOFFSKY
INVENTOR.

BY
ATTORNEY

United States Patent Office 3,239,672
Patented Mar. 8, 1966

3,239,672
PHOTOSENSITIVE MEANS FOR DETECTING THE POSITION OF RADIATING OR REFLECTING BODIES
Heinz Gabloffsky, Torrance, Calif., assignor, by mesne assignments, to The Bunker-Ramo Corporation, Canoga Park, Calif., a corporation of Maryland
Filed Feb. 12, 1959, Ser. No. 792,920
1 Claim. (Cl. 250—203)

This invention relates to apparatus for use in detecting the existence of radiating or reflecting bodies and/or their angular positions, and, more particularly, to means for developing an electrical signal representing the position of a body radiating energy in the visible and/or invisible light spectrums.

In the prior art, numerous systems have been disclosed for detecting and determining the position of bodies from which is emanated some form of detectable energy such as light heat, or radio frequency waves. A number of these prior art systems have provided considerable sensitivity and accuracy in their operation. However, especially in the field of visible or infrared target detection, there exists considerable need for improving the sensitivity and response speed of such systems so as to afford more suitable apparatus, by way of example, for detecting or tracking moving bodies or targets such as modern supersonic aircraft and missiles.

As will appear hereinafter, although the present invention finds particularly useful application to detection systems responsive to infrared radiation, the novel features thereof are also of advantage in radiant energy detection systems based upon the detection of radio waves and visible and invisible light rays. To this end, the term "optical," often employed as descriptive of visible light processing systems, will, as used in the specification, be construed as being also descriptive of systems for collecting, directing, refracting, transducing and detecting radiant energy other than that constituting visible light.

In most prior art optical systems employed for detecting and determining the position of a target, the space in which it is suspected that an energy emanating target may be present is systematically examined by an optical type energy collection apparatus. The energy collection apparatus, generally employing combinations of mirrors and lenses, is designed to be responsive on a selective basis to only that energy which is collected within a given angular field of view so that the collection apparatus may be regarded as having a response pattern generally representable as a solid cone extending into space with the apex of the cone positioned at a given point of observation. This angular field of view, or response pattern, is generally referred to as the "instantaneous field of view" or sometimes "field of view" of the collection apparatus and is defined by the size of the "field stop" characterizing the collection apparatus itself. The "field stop" size of such collection apparatus is generally determined either by a diaphragm restriction in the optical path within the apparatus or by inherent characteristics of the lenses or mirrors used. The optical axis of the collection apparatus, as projected into space, is, in most cases, centrally disposed within this instantaneous field of view so that the optical axis of the energy collection system is in geometric coincidence with the axis of the conical response pattern of the apparatus. The energy collected within the instantaneous field of view is directed to an energy sensitive cell which develops an electrical potential or signal, the magnitude of which represents the intensity of the total radiant energy collected within the field of view which includes energy emanating from the target per se as well as background radiation such as sky, clouds, water, etc., against which the target may appear.

However, in accordance with the prior art technique, it is common to find that a circular disc-like "chopping" reticle is positioned within the energy collection apparatus at an image or focal plane thereof. Such a reticle is rotated about its axis in interrupting relation to radiation collected by the apparatus to "chop" the radiation as it is directed to the sensitive cell. This type of reticle is generally called a chopping reticle because it comprises a pattern of carefully dimensioned alternate areas of relative opacity and transmissivity to energy collected by the apparatus to intercept radiation. These areas often have the shape of sectors of a circle. The areas of transmissivity, defined by alternate areas of relative opacity on the reticle, are sometimes called "reticle apertures." It has been the practice to align the rotational axis of the reticle with the optical axis of the collection apparatus as at an image plane thereof so as to focus or image the field of view on the reticle. The field of view, as imaged on the reticle, is generally circular in shape and is defined in size by the aforementioned field stop of the apparatus. The diameter of the reticle has in the past been made just large enough to embrace the entire imaged field of view to thus interfere with all energy reaching the cell.

In prior art systems incorporating such chopping reticles, the reticle is rotated about its axis at a selected angular velocity. As it rotates, the reticle apertures move across the imaged field of view and modulate the total energy passing therethrough to the energy sensitive cell. The cell then produces an output signal having a direct-current component proportional to the average illumination thereof and generally a plurality of alternating-current harmonically related modulation components, the largest and fundamental alternating-current component having a frequency equal to the chopping frequency of the reticle. The magnitude of the modulation of the energy radiated from targets or images in the imaged field of view by a chopping reticle and hence the magnitude of the corresponding fundamental alternating-current signal produced by the cell will be a maximum only for targets having the same order of dimensions as the reticle apertures themselves in the direction of movement thereof. This is true because only a relatively small portion of the energy radiating from larger or smaller targets will be modulated continuously by the reticle chopping action, whereas the total energy received from a target having a linear dimension equal to that of a reticle aperture will be modulated. Due to the fact that energy radiating from targets of a predetermined size are modulated to a greater extent than larger or smaller ones, a chopping reticle thus effectively discriminates against targets of the larger and smaller sizes in favor of those of the predetermined size. In other words, it exhibits a certain size selectivity as an electrical filter exhibits a certain time-frequency selectivity. Analogously then, the target size discriminating effect of a chopping reticle is called "space filtering" because the maximum contribution of targets to the fundamental alternating-current component of the cell output signal is limited by a chopping reticle to targets of a certain size. In practice, it is desirable to make the width of the reticle aperture substantially equal to the blur circle of the optical system. The "blur" circle is the minimum size to which any size target can be focused on the reticle due to inherent aberrations in the mirror and lens elements of the optical system.

In practice, the detection of and determination of the position of a given target with apparatus including a chopping reticle is accomplished in two steps, usually termed "search" and "track." First, in search, the collection apparatus is mechanically driven to execute a systematic scanning action which results in the exploratory examination of a volume of space which is many times greater than the instantaneous field of view subtended by the collection apparatus, and in which it is expected that an energy radiating target may be present. The output of the energy sensitive cell is oftentimes recorded or stored, on a memory basis, as the search action proceeds, so that after completion of the search cycle the apparatus may be automatically returned to one or more selected positions corresponding to the orientations of the apparatus at those specific instances within the period of the searching cycle at which target energy has been detected. After redirection of the apparatus so that its field of view embraces that general volume in space in which a specific target has been detected, the second or "track" step of the position determining process is initiated, namely, that of determining the angular position of the target with respect to the optical axis of the energy collection apparatus during which time the optical axis is often moved or "nutated" around a circular path in space which embraces the target.

During nutation, the optical axis of the energy collection system, as projected into space, is moved around a closed loop or path defined on a spherical surface in space. This path is so positioned and restricted in size as to afford pick-up of energy from the target during the movement of the instantaneous field of view. When such is the case, a frequency modulation will be imposed on the output signal of the radiant energy sensitive cell. By comparing the phase of the frequency modulating signal of the cell output signal with a signal having a phase representing the position of the optical axis as it is nutated, the polar angle coordinate of a target in the imaged field of view may be ascertained. Similarly, the magnitude of the frequency modulating signal will be proportional to the polar radius coordinate of the target in the imaged field of view. From this information, a servo control system may be brought into action to track or follow any target motion.

Although both searching and tracking may be performed with the reticle axis coinciding with the optical axis of the collection apparatus, there is a distinct disadvantage in such systems due to the inherent poor space filtering characteristics of spoked type reticles. Specifically, a conventional spoked reticle is far from an ideal space filter because the distance between relatively opaque areas defining the reticle apertures varies with the radial distance from the reticle center. Although some space filtering is performed by centered spoked reticles, undesired signals, generally called noise, are produced by the sensitive cell at the fundamental chopping frequency of such a reticle. Maximum contribution to this noise is made by noise sources presenting images in the imaged field of view equal in size to reticle aperture spacing at the particular radial distance from the reticle center that they exist. The effect of plural noise sources is then cumulative and all radiant energy sources such as clouds, sun, terrain, etc., which comprise "background" radiation against which a target may appear, are potential noise sources. The problem of distinguishing a target signal from noise produced by the above-desired sources is an unusually difficult one. Due to the fact that such noise appears as signal energy at the fundamental chopping frequency of the reticle, an electrical filter simply cannot be used to discriminate against this type of noise.

A distinct disadvantage is encountered by employing conventional centered chopping spoke reticles in search. As the axis of the optical system is translated in any rectilinear pattern, a Doppler frequency signal of a lower frequency is generated by passage of a point target on one side of the reticle center and one of a higher frequency by passage of a point target on the opposite side of the reticle center. In the first case, scanning is performed in the same direction as reticle rotation and in the second case in the opposite direction. This means that the effective chopping frequency of the system may be shifted over a relatively large frequency band depending upon the position of the target with respect to the axis of the reticle. This means that the bandwidth of the signal transducing system following the energy sensitive cell must also have a corresponding relatively large bandwidth. This decreases the signal to noise factor of the system and reduces its effective selectivity.

Tracking performed by nutation of prior art optical systems also has several large disadvantages. In the first place, during nutation the entire optical collection apparatus is moved in space around the target. Since the aberration or distortion imposed on the target changes throughout the field of view, the effective size of target image will change during nutation because the effective blur circle of the system is different at different points in the field of view. Thus, with a given sized reticle aperture, the amplitude of the signal developed by the cell will change during nutation. Thus, again an undesirable result is produced by this variation which is similar to the rather poor space filtering of "spoked" reticles.

Prior art tracking systems also continually suffer from high level scanning noise. This is because the entire background over which the field of view of the collection apparatus is scanned in nutation may encounter widely varying radiation intensities. Thus, the intensity of radiation intercepted by the energy sensitive cell will be modulated simply by virtue of the scanning motion of the energy collection apparatus and undesirable signals will be generated other than those produced by point targets. Since, by general definition, any signals except point targets are considered "noise" and are considered undesirable because special means must be provided to discriminate against them, scanning noise is, therefore, a definite disadvantage of prior art tracking systems.

Still further, in prior art centered reticle tracking systems a non-linear representation of target position is also encountered during nutation when a target falls outside of the instantaneous field of view of the collection apparatus or when the image of the target happens to fall on the rotational axis of the reticle. This is true because of the complete loss of any target representing modulation during this period of time.

Still another serious disadvantage of prior art nutating tracking systems is that the whole optical apparatus of the system must be moved. By nature, this optical apparatus must be both large in size and relatively heavy. The fact that it must be nutated means that its performance is necessarily unreliable, due to the mechanical nature of the movement which must be produced. Still further, the optical apparatus must be moved at a relatively slow rate and only by the use of considerable amount of electrical power. Due to the fact that the optical apparatus is of a substantial size, it must be made of rather heavy materials to withstand the stresses imposed upon it by the acceleration forces causing it to nutate.

The present invention overcomes these and other disadvantages of the prior art by providing the combination of a movable reticle so positioned with respect to an image representing the intensity variations within a restricted field of view sustained by an energy collection system that the apertures of the reticle scan the image with the relative motion of all reticle apertures embraced by the field of view, at any instant, being in substantially the same direction with respect to a given reference line within the field of view. In tracking an object conditionally falling within the field of view, additional means are provided, in accordance with the present invention, for changing the direction with which the reticle apertures effectively scan the imaged field of view.

The reticle employed with the invention may be of several designs, but, as stated previously, a conventional disc shaped spoked reticle may be employed. In search, the reticle may just be rotated about its axis and the collection apparatus moved. In tracking, the reticle is again rotated about its axis but its axis, in turn, is translated around the imaged field of view. Translation of the reticle axis itself causes a relative motion between the image of a target and the reticle apertures themselves alternately in the same and in an opposite direction within the imaged field of view. This produces a frequency modulation of the signal developed by the cell from which the position of a point target in the imaged field of view may be determined. This determination may be made in exactly the same manner as is made by prior art tracking systems utilizing nutation. As before, the magnitude of frequency modulation thus produced is representative of the polar radius coordinate of a point target in the imaged field of view and the phase of the frequency modulation signal with respect to a predetermined phase of the reticle axis translation is representative of the polar angular coordinate of the point target in the imaged field of view. Thus, the same effect is produced by the present invention as that produced by prior art systems, but nutation of the energy collection apparatus during tracking is obviated. For this reason, the invention has several large advantages over systems of the prior art.

For example, the invention provides improved space filtering over the nutating prior art optical systems both in searching and tracking because the instantaneous field of view is so projected on the reticle that the reticle apertures active within the field of view at all times are of substantially the same configuration.

Due to the fact that in search, depending upon its position within the imaged field of view, a target in the prior art might pass across the reticle in the same or opposite direction to that of reticle spoke chopping motion at successive times during search, a frequency shift could be encountered which would make it necessary to reduce the selectivity of the associated signal transducing system connected to the output of the energy sensitive cell. However, in accordance with the invention, regardless of the position of the target within the imaged field of view, the direction of chopping will always be in the same relation to the motion of the search during any straight line portion of the search cycle. That is, during any given straight line path comprising the search sequence, a target will not be scanned in a manner such that the energy radiated by it will be chopped in either one or two directions but will be chopped only in one direction. This means that the present invention is much more selective in searching operations than the conventional centered chopping spoke reticles of the prior art where a larger band of frequencies are generated by virtue of the fact that targets are scanned over the reticle in varying directions relative to reticle rotation on opposite sides of the reticle center.

The well known variations in the effective size of the "blur circle," encountered by prior art centered reticle type nutating tracking systems is avoided by the use of the invention and the resolution of point targets is also thus much improved over that produced by prior art devices. This is true again because nutation of the field of view in space is eliminated.

The scanning noise produced by prior art tracking systems using nutation of the field of view in space is also substantially reduced since the background of the system of the present invention is always substantially stationary. It is to be noted especially that during tracking the instantaneous field of view in the instant case remains in a substantially stationary position, or at least it is moved relatively slowly during tracking to keep a point target exactly at its center and on the optical axis of the collection apparatus.

Also, since during the operation of the invention, in tracking, the instantaneous field of view does not move appreciably in space, a target cannot be lost momentarily as it often is in nutating systems of the prior art where it may either fall outside of the instantaneous field of view or on the reticle axis during a portion of the nutating cycle of the energy collection apparatus. Thus, a more linear indication of target position may be produced in the instant case over the entire instantaneous field of view where this was not possible with prior art nutating optical systems.

In accordance with the invention, a nutation of the entire radiant energy collection apparatus is completely obviated and may be maintained substantially stationary except for minor movements required to actually follow a target. Hence, the prior art disadvantage of nutation requiring movement of the relatively large size and, therefore, necessarily a relatively heavy radiant energy collection apparatus is eliminated. The reliability of the present invention is, therefore, substantially improved over that of the prior art due to the substantial reduction in the size and weight of the equipment which must be mechanically moved during the tracking operation. Still further, the large electrical power required to nutate the large and heavy collection apparatus in the prior art is obviated.

The above-described and other advantages of the invention may be better understood when considered in connection with the following description. In the drawings which are to be regarded as merely illustrative:

FIG. 7 is a schematic diagram illustrating movement of an instantaneous field of view in a search operation which may be performed by the apparatus shown in FIG. 5;

FIGS. 8a and 8b show graphs of a group of waveforms characteristic of the operation of the apparatus shown in FIG. 5;

FIG. 10 is a diagrammatic view of one embodiment of the invention;

FIG. 11 is a sectional view of a conventional optical collection apparatus diagrammatically illustrated in FIG. 10 which may be employed with the invention;

To better understand the present invention and typical operating environments therefor, some consideration will first be given to several fundamental aspects of optical-type target detection systems embodying chopping reticles.

Figure 1A:
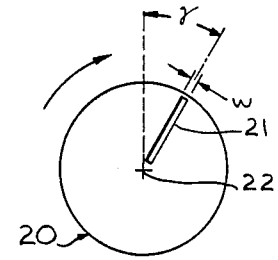
FIG. 1(a) is a diagrammatic view of a reticle having one transparent area therethrough adapted to pass over a circular imaged field of view.

For example, in the drawing of FIG. 1(a), a reticle 20 having only a single rectangular slot 21 is shown having a symmetrical center 22. Slot 21 is radially disposed from center 22 to the periphery of reticle 20. In FIG.

1(b), the slot 21 is indicated in dotted lines at 21' passing around a circular imaged field of view 23 having a symmetrical center 22' which may be in a position corresponding to the center 22 of reticle 20. Imaged field of view 23 contains clouds 24, ground 25 having a roadway 26 thereon, buildings 27 on a horizon 28 with trees 29. Also shown by way of example in FIG. 1(b), within imaged field of view 23, is an airplane 30. In the instant case, it will be assumed that it is the airplane 30 which is to be detected, its position determined, and its movement tracked. For purposes of illustration, the airplane 30 is shown substantially larger than would be the case in typical detection environments where in practice the airplane would be resolved only as a circle corresponding in size to the blur circle of the optical collection apparatus defining the imaged field of view 23.

Figure 1B:
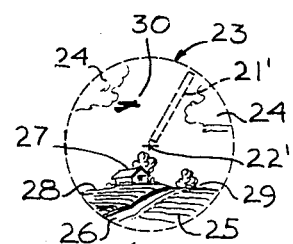
FIG. 1(b) is a diagrammatic view of an imaged field of view having the transparent area of the reticle shown in FIG. 1(a) illustrated in dotted lines.
Figure 2:
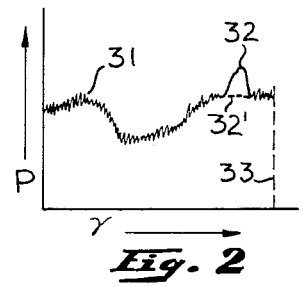
FIG. 2 is a graph of the radiant energy power which may pass through the transparent area during movement of the reticle shown in FIG. 1(a) over the imaged field of view shown in FIG. 1(b)

Reticle 20, shown in FIG. 1(a), is constructed of a sheet material relatively opaque to radiant energy. However, in the sheet, the rectangular aperture 21 of a width "w" is provided which is relatively transparent to radiant energy. The total illumination power P in watts, passing through aperture 21 as reticle 20 is rotated about its center 22 and about the center 22' of imaged field of view 23 may be plotted as a function of the angular displacement $\gamma$, that aperture 21 has moved from an initial vertical position, which has been arbitrarily selected. Such a graph is indicated by a line 31 in FIG. 2. In FIG. 2, the portion 32 of solid line curve 31 is shown to indicate that that portion of the function which would be produced in response to the airplane 30 appearing in imaged field of view 23 shown in FIG. 1(b).

The relatively flat dotted line portion 32' of the function depicted by curve 31 is illustrated for purposes of comparison to indicate the appearance of the function when airplane 30 does not exist in imaged field of view 23. A comparative analysis of curve 31 inclusive of either portion 32 or 32' may be made by what is known as the Fourier transform. As before, the symbol $\gamma$ represents the angular position of aperture 21 relative to a vertical line extending from center 22 upwardly as shown in FIG. 1(a). A dotted line 33 indicating a particular angular position of $\gamma$ is located at a point $\gamma = 360°$.

Figure 3:
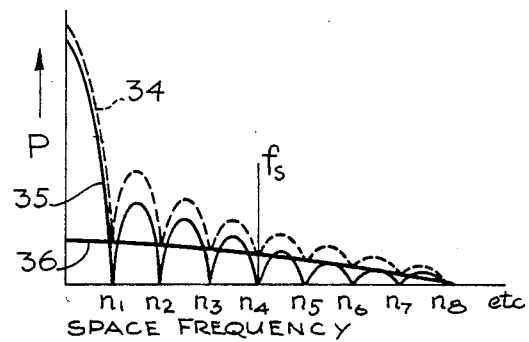
FIG. 3 is a graph of two Fourier transforms of portions of the curve shown in FIG. 2.

The Fourier transform of the power versus angle functions shown in FIG. 2 appears substantially as shown in FIG. 3. In considering the transforms of FIG. 3, it is helpful to note that it is common practice, in electrical signal analysis, to express an amplitude or power versus time function in terms of a power distribution of electrical signal frequencies or frequency distribution. For example, if the time varying demands of some electrical load circuit would be represented by an electrical signal waveform, this signal waveform, by Fourier analysis, can be expressed or transformed into an expression depicting the power amplitude relationships between a plurality of electrical signal frequencies. That is, a power versus time function is transformed into an equivalent expression of power versus time-rate-of-power change. By study of such a Fourier analysis or transform, it can be determined at what signal frequency or frequencies the largest amount of electrical power is represented. Likewise, in connection with the power versus angle functions of FIG. 2, a Fourier transformation of these functions will result in an expression of power versus angle rate-of-power-change. Just as the time-rate-of-power change employed in electrical signal analysis is expressed in cycles of power change per unit time (time frequency or cycles per second), so angle-rate-of-power change in image brightness analysis may be expressed in cycles of brightness per unit angle (angle frequency). The concept of the frequency with which the power passing through a reticle aperture changes per unit angle of aperture displacement, gives rise to the phrase "space frequency." Thus, any image of an object may be described in terms of the amplitude relation between a plurality of space frequencies. It follows then that when an imaged field of view such as indicated in FIG. 1(b) contains relatively small objects, such as the aircraft 30, the power versus space frequency description of this field of view will indicate substantial power at higher space frequencies. On the other hand, the space frequency description of larger objects in the field of view shown in FIG. 1(b) would indicate relatively less power at these higher values of space frequency.

With the above in mind, the transform 34 of FIG. 3 describing the space frequency content of the field of view in the presence of a target, shows that at higher values of space frequencies a considerable amount of power is represented. Contrariwise, the transform 35, describing all the other larger objects in the imaged field of view in the absence of the target 30, represents considerably less power at these higher frequencies. The difference between the transforms 34 and 35, of course, represents the power versus space frequency description of the target 30. This description is indicated by line 36.

Figure 4:
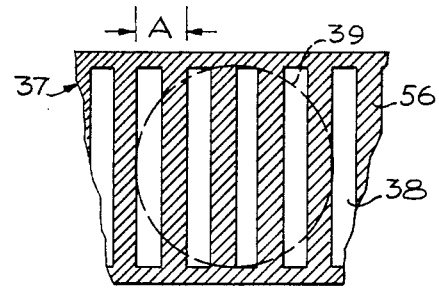
FIG. 4 is a diagrammatic view of one type of reticle which may be employed with the invention.

In accordance with the present invention, ideally, a chopping reticle arrangement equivalent to that shown in FIG. 4 is employed which comprises a reticle 37 having an infinite number of reticle apertures 38 which movably intercept a field of view 39. In the arrangement of FIG. 4, it is seen to be typical of the present invention that as the reticle 37 is moved across the field of view 39 all of the reticle apertures embraced by the field of view are moving in substantially the same direction. Similar edges or sides of apertures 38 are spaced from one another by a given distance A which is appreciably less than the image field of view 39. If the variations in the total power passing through the reticle 37 over the entire imaged field of view indicated at 39 thereon is examined while the reticle is moved across the field of view, it will be found that the peak to peak amplitude of such variations will be a maximum in response to substantially only those image intensity gradients or objects whose effective dimensions, in the direction in which the reticle is moved, is substantially $A/2$. This intensity change represents a periodicity of intensity change, per unit distance, of A or a space frequency of $1/A$ in cycles per unit distance, rather than cycles per unit angular measure, with the reticle 20 shown in FIG. 1(a). Thus, roughly speaking, the action of such a reticle comprising an infinite number of apertures is to reinforce a particular value of space frequency. The action of reticle 37 of FIG. 4 is, viewed from a different standpoint, discriminatory in nature. That is, the reticle tends to discriminate against all space frequencies other than $1/A$ and its harmonics. If the reticle 37 were provided with only one aperture 38 corresponding to the aperture 21 of reticle 20, shown in FIG. 1(a), the curve 31, shown in FIG. 2, would have to be changed corresponding to movement of the reticle in the direction of arrow 40. This curve would have to be modified to go to zero at a certain distance of the movement of the aperture 38, say at zero from the left-hand side of imaged field of view 39 to zero at the right-hand side. However, the same frequency description of objects may still be analogous to those illustrated in FIG. 3. However, the space frequency description of the field of view 39, shown in FIG. 4, with, and without, all the background and target 30 present therein, includes the effect of the reticle aperture in scanning the finite imaged field of view 39 as an object itself. It will be remembered that the shape of the imaged field of view is defined by the aperture characterizing the energy collection apparatus. That is, the circular imaged field of view as a whole has some value of average brightness. Thus, the reticle aperture, in passing over the imaged field of view, transmits power changes representative of an object having the size of the imaged field of view itself. This is represented by the fact that the energy passed by an aperture 38 before it enters imaged field of view 39 will pass zero energy and after it has passed completely through imaged field of view 39 will pass zero energy. Because of the zero intensities of the extreme positions of aperture 38, the Fourier transform of the power versus distance function, which may be similar to that indicated at 32' in FIG. 2, as represented at 35 in FIG. 3 (the background alone), will have nulls $n_1, n_2 \ldots n_8$, etc. These nulls correspond to space frequencies at which the average intensity of the background, as limited or shaped by the aperture defining the circular field of view, contributes no energy.

Thus, the reticle space A of FIG. 4 is such to reinforce a space frequency corresponding to a null or zero of the background 35. The presence or absence of a target such as aircraft 30 in imaged field of view 39 may be quite effectively determined. Such nulls in the background transform are indicated at $n_1, n_2, n_3, n_4, n_5, n_6, n_7$, etc., each null corresponding to a value of space frequency at which substantially no power exists or is contributed by background content of the field of view. Thus, any power that can be measured through the reticle 37, when so dimensioned as to reinforce a null, must be attributable to an object having dimensions comparable to that of the aircraft 30, if such is present in imaged field of view 39. The particular background null of the reticle 37 which it should be constructed to reinforce is not critical. With a transform of the character shown in FIG. 3, however, it is expedient to choose a null defined by those portions of the curve whose slope adjacent the null is of lesser value than slopes adjacent other nulls. Such nulls seem to appear at higher value of space frequencies. This reduces the precision with which the reticle aperture spacing must be dimensioned to realize the substantial percentage change in the power it transmits as a function of the presence or absence of the target. However, as the transform of FIG. 3 shows, the amount of power contributed at any given value of space frequency within the field of view tends to decrease as the value of space frequency is increased. Over-all system signal-to-noise considerations, therefore, suggest that a null be selected at some value of space frequency close to the space frequency at which an expected target contributes substantial energy. As a compromise, therefore, between precision with which the reticle construction must be carried out and signal-to-noise considerations, a null such as $n_4$, in FIG. 3, is, by way of example, selected to define that space frequency which the reticle should be designed to reinforce.

Thus, if in FIG. 4, the reticle spacing A is such to reinforce the space frequency $f_s$ (corresponding to the null $n_4$) in FIG. 3, and the power transmitted through the reticle analyzed, it will be found that a substantially greater amplitude of power modulation will be effected by the chopping action of the reticle in the presence of a target 30 than in its absence. This applies, of course, when the target image is substantially of the same dimension as the reticle aperture spacing, namely $A/2$.

In order to better understand the disadvantages of the prior art and the manner in which the present invention overcomes them, the general arrangement of the component parts of a prior art radiant energy system must be considered. Such a system is shown in FIG. 5 including a detection assembly 41, a mechanical drive 42 including horizontal and vertical gimbal supports for the detection assembly 41, a search program 43 to move detection assembly 41 in a predetermined manner for searching a selected surveillance volume, a filter 44 connected from the output of detection assembly 41, a detector 45 connected to the output of filter 44, and a recorder 46 connected from the output of detector 45 for recording signals received during search.

Detection assembly 41 includes radiant energy collection apparatus 47 to project a circular imaged field of view 48 on the symmetrical center of a reticle 49 having a gear 50 mounted thereon. The reticle 49, as shown in more detail in FIG. 6, comprises a substantially planar disc defining a plurality of alternate angularly disposed areas of relative opacity and transparency to the intensity variations throughout an image representing the field of view of an apparatus such as 47. By way of example, in FIG. 6, the relatively transparent areas are indicated at 57, while the relatively opaque areas are indicated at 58. The sector-like areas may be thought of as extending from a smaller radius to a greater radius from the symmetrical axis or center 67 of the reticle. The transparent areas 57 of the reticle can then be seen to form apertures through which radiant energy may pass, and, hence, the transparent areas 57 may be considered as the reticle apertures comparable in function to the apertures 38 of reticle 37 in FIG. 4. In the prior art arrangement of FIG. 5, it can be seen that the optical axis 47a, of the optical collection apparatus 47, is coincident with the axis 67 of reticle 49. Reticle 49 is rotated about its symmetrical center by a spin drive motor 51 which rotates a gear 52 on a shaft 53, gear 52 meshing with gear 50 to rotate reticle 49 to which gear 50 is fixed. Radiant energy passed through reticle 49 is focused on a radiant energy sensitive cell 54 by means of a lens 55. The output of cell 54 is then connected to filter 44.

Figure 6:
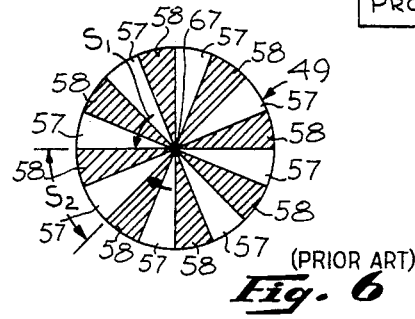
FIG. 6 is a front elevational view of a spoke-type reticle employed in the prior art.

It is to be noted that in connection with the reticle 37 of the invention shown in FIG. 4, the transparent areas 38 are equal in width to opaque areas 56 and are at all points on the reticle spaced the same distance apart. Thus the alternate opaque and transparent areas are substantially equal in size. This means that the fundamental of the alternating current signal or carrier produced by reticle chopping action will be as large as it is possible to produce in relation to the amplitude of its harmonic components. However, on a circular disc type reticle, the transparent areas cannot be spaced an equal distance apart at all points on the reticle because the circumferential separation of the transparent areas and their dimension are variables depending upon the radius $r$, at which they are examined. For this reason, the relatively transparent and opaque areas respectively indicated by the indices 57 and 58 associated with reticle 49, in FIG. 6, are sector-like in shape, and are substantially equal in size. It is to be noted that the arcuate distances indicated at $s_1$ and $s_2$ on reticle 49, in FIG. 6, are, therefore, different. This means that the size discrimination characteristic of reticle 49 shown in FIG. 6 is not nearly as good as that of the reticle 37 shown in FIG. 4. That is, background objects of a size $s_2/2$ would be chopped with the same efficiency at the perimeter of reticle 49 as a target of a size $s_1/2$ would be at the radius of $s_1$ indicated in FIG. 6. Thus, the reticle 37 shown in FIG. 4 may be considered as a space filter substantially more selective than the space filter comprising the conventional spoke-type reticle 49 shown in FIG. 6 for the reason that the reticle chopping action of reticle 49 shown in FIG. 6 reinforces a plurality of fundamental space frequencies whereas the chopping action caused by movement of reticle 37 in a direction 40, indicated in FIG. 4, reinforces only a single fundamental space frequency.

Figure 5:
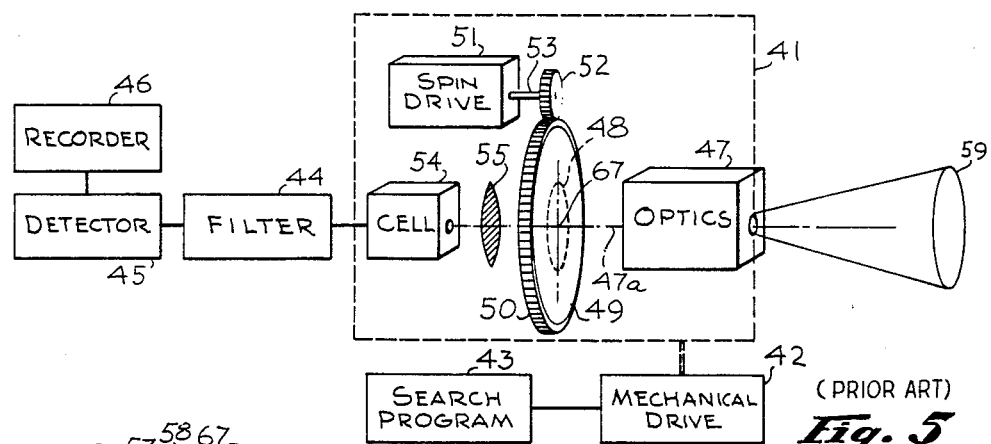
FIG. 5 is a diagrammatic view of a conventional radiant energy detection system employing a conventional spoke-type reticle on which an imaged field of view is centrally located, with the optical axis of the energy collection system being coincident with the rotational axis of the reticle.

A search procedure which may be employed in the control of detection assembly 41, by search program 43, through mechanical drive 42, shown in FIG. 5, is illustrated in FIG. 7 where the field of view 59 is shown to be initially positioned at a time $t_1$ in the upper left-hand corner of a predetermined optical frame. For convenience in description, the leading edge of the field of view is, at this position, designated by index $t_1$. This frame is indicated by the dotted line rectangle 60. By proper control of the mechanical drive 42 by search program 43, shown in FIG. 5, the field of view 59 may be made to systematically scan the frame 60. The manner in which this systematic scanning of the frame 60 is undertaken may follow various patterns. By way of example, in FIG. 7, the leading edge of the field of view 59 is, at time $t_1$, positioned as indicated and moved from left to right so that at time $t_{10}$ the field of view 59 is at the right-hand extremity of frame 60. During the interval from time $t_{10}$ to time $t_{12}$, the field of view is moved downwardly along a curved path P so that its leading edge is at the position shown at time $t_{12}$. Thereafter, the field of view moves from right to left to the position indicated at time $t_{22}$. This systematic pattern of scan, generally indicated by the dotted line 60' (with arrows $V_s$ thereon indicating the vectorial direction of scan velocity) is continued until the entire frame 60 has been examined. Purely by way of example, in the illustration of FIG. 7, the subject matter embraced by the field of view time $t_{30}$ is shown to correspond to that indicated in FIG. 1(b). The horizon line 28 of FIG. 1(b) is, in FIG. 7, shown to a fuller extent, however, and can be seen to be of a length many times greater than that portion of it embraced by the field of view.

Signals which may be produced at the output of filter 44 shown in FIG. 5 during the search operation indicated in FIG. 7 is shown in FIG. 8. At some time such as $t_{12}$, the position of the leading edge of the field of view will be coincident with the position indicated at $t_{12}$, in FIG. 7, and the field of view will be moving from right to left as indicated by the arrow on dotted line 60' adjacent this position. At this instant, it will be assumed that the aircraft 30' will not have as yet been encountered by the moving field of view. The content of the field of view at this instant will, of course, be in the process of analysis by rotating reticle 49, and there will be some background content within the imaged field of view having a space frequency description causing a relatively low amplitude alternating current carrier signal (the fundamental of which corresponds to the chopping frequency of the chopping reticle) to appear at the output of filter 44 shown in FIG. 5. This is generally indicated by the low amplitude portion $85_L$ of the alternating current carrier signal depicted at 85 in FIG. 8(a). Still at a later time, $t_{26}$, the field of view will have been lowered somewhat and now moving from left to right although not as yet having encountered the aircraft. The output of the cell will then be relatively low such as the previous level $85_L$.

However, as soon as the leading edge of the field of view encounters the aircraft 30 (such as at time $t_{28}$), the amplitude of the carrier signal appearing at the output of filter 44, will increase, by a substantial amount, to an amplitude illustratively indicated in FIG. 8(a) at $85_H$. The amplitude of the carrier 85 rises to the value $85_H$ for reasons hereinabove set forth, namely, the reticle apertures have been so dimensioned so as to reinforce a plurality of space frequencies including a space frequency at which substantial power is contributed by objects whose images have a size substantially corresponding to the image size of the aircraft being sought. It is under these conditions that the percentage modulation of the total energy passing through the reticle, by virtue of the chopping action of the moving reticle spokes on the target image, will be maximized. This increase in the ampltiude of the carrier produced at the output of filter 44 will continue for a duration of time corresponding to the length of the time that the target 30 remains within the moving field of view. This has been illustratively shown in FIG. 8 to be for a period of time $t_{28}$ to $t_{31}$, which period is termed the "dwell" period of the object or target within the moving field of view.

The envelope of the carrier modulation indicated in FIG. 8(a) is derived, as shown in FIG. 5, by means of the combined action of filter 44 and envelope detector 45. At the output of detector 45 shown in FIG. 5, there will appear an alternating current signal of the character shown at 86 in FIG. 8(b). Here a portion $86_L$ corresponds to the ampltiude of the carrier $85_L$ in FIG. 8(a), likewise portion $86_H$ corresponds respectively to the carrier at amplitude $85_H$ in FIG. 8(a).

The change in amplitude of the envelope 86 to the value $86_H$, upon the field of view occasioning a target, therefore represents a relatively large percentage increase in the value of the detector output signal 86.

With the prior art, centered reticle arrangement depicted in FIG. 5, and during the searching operation shown in FIG. 7, if a target appears above the center of the field of view, and, therefore, above the center of the reticle 49 in traversing the path, for example, as indicated at 60' in FIG. 7, and the reticle is spinning clockwise as taken looking out through the reticle toward the field of view, it will be seen that the direction of reticle movement above the center will be in the same direction as the scan vector depicted by arrow $V_s$ between times $t_{26}$ and $t_{30}$. The arrow $V_s$ indicates the vector direction in which the field of view moves in following out the search program. Conversely, if a target appears below the center of the field of view 59 during its excursion along the line 60', the direction of reticle movement at the particluar target position considered above will be opposite the direction of scan velocity $V_s$. Thus, a Doppler frequency shift in the value of the carrier is produced of a magnitude depending upon the position in which a target exists in the instantaneous field of view 59. For this reason, the bandwidth of filter 44, in FIG. 5, must be rather large to pass output signals due to targets existing both above and below the center of imaged field of view or on opposite sides of a line extending through the center of the instantaneous field of view 59 in the direction of scan velocity. This is one of the serious disadvantages of the prior art conventional spoke-type reticle arrangement shown in FIG. 6 wherein the centered imaged field of view 48 is projected thereon by radiant energy collection apparatus 47 shown in FIG. 5. Thus, if the ideal reticle arrangement of the invention is employed, the direction of movement of all reticle apertures over the imaged field of view will be the same throughout the imaged field of view. For this reason, regardless of the position of a target in the imaged field of view, the Doppler frequency created by given vectorial values of scanning and reticle chopping motions will be the same. For this reason, a band pass filter employed in place of filter 44, in accordance with the invention, may be made substantially more selective.

Thus far, it has been explained how the reticle arrangement of the invention provides improved space filtering and provides means by which a more selective electrical filter may be employed to improve the operation of the radiant energy collection apparatus. As will be brought out more fully hereinafter, the present invention in one of its forms may be used in either searching or tracking. Still further, the Doppler frequency shift problem of conventional spoke reticles such as reticle 49 having the centered imaged field of view 48 thereon is a disadvantage only in search in the prior art. Hence, the advantages of the invention in overcoming problems of frequency shift relate only to the search operation. The remaining advantages of the invention described specifically hereinafter over prior art apparatuses relate specifically to problems which arise with prior art radiant energy detection systems during tracking operations.

Figure 9:
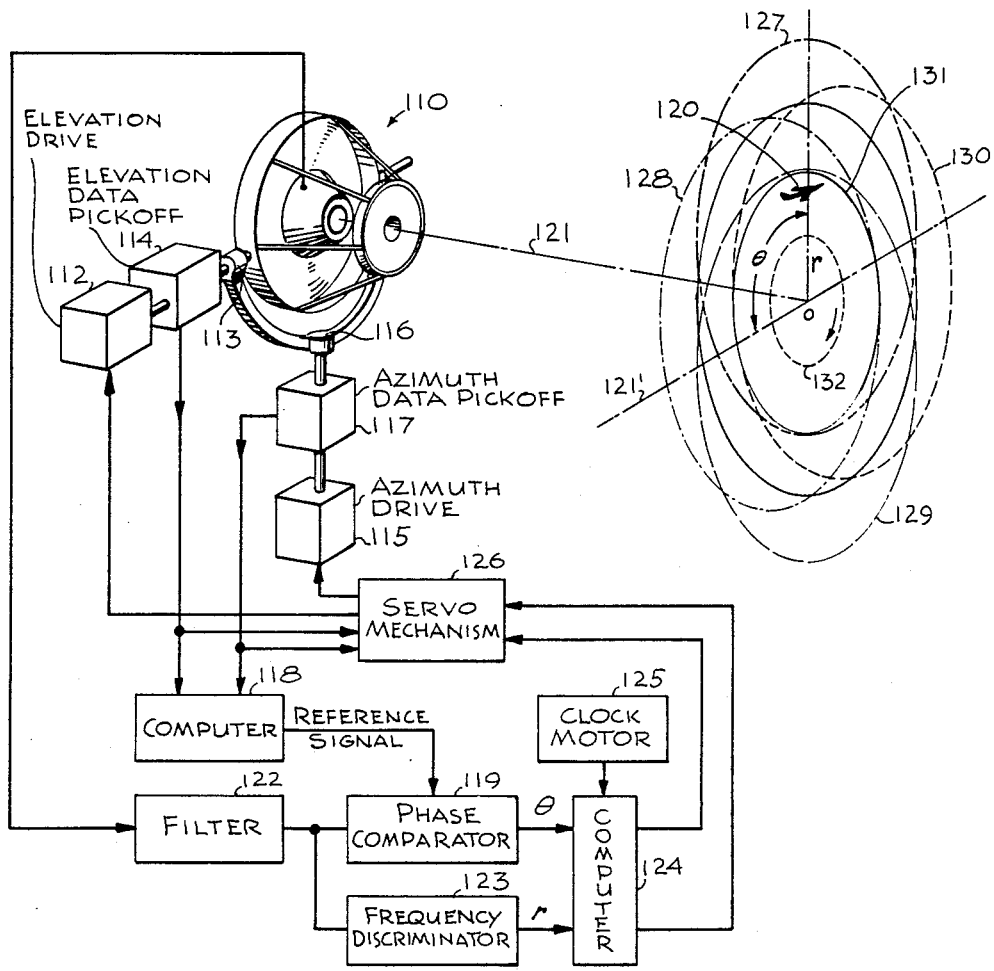
FIG. 9 is a schematic diagram of a prior art radiant energy detection system employing nutation during a tracking operation.

The mechanical structure of conventional prior art detection assembly 41 shown in FIG. 5 may be as indicated 110 in FIG. 9 having a mechanical drive including an elevation drive 112 for elevation gimbal supports 113, an elevation data pick-off 114, an azimuth drive 115 for azimuth gimbal supports 116, and an azimuth data pick-off 117. The outputs of the data pick-offs 114 and 117 are converted in computer 118 to a reference signal which is impressed upon a phase comparator 119 to produce an output signal $\theta$ proportional to the angular displacement of a target or airplane 120 shown in FIG. 9. The angle $\theta$ is shown as measured in a plane perpendicular to the axis of nutation 121, and is the angle, in this plane, between a reference line 121' and a straight line extending from the axis 121 and the target itself. The reference line 121' is generally established as horizontal. Phase comparator compares the reference signal output of computer 118 to the output of a radiant energy sensitive cell, not shown, in detection assembly 110 which passes through a filter 122 to both phase comparator 119 and a frequency discriminator 123. Frequency discriminator 123 produces an output signal proportional to the magnitude of the polar coordinate $r$ of the position of airplane 120 from a point of origin indicated at zero in FIG. 9. The coordinates $r$ and $\theta$ are impressed upon a computer 124 having a clock motor input 125 to impress output signals on a servo mechanism 126 to control elevation and azimuth drives 112 and 115 to cause nutation of the detection assembly 110 about airplane 120. Nutation of detection assembly 110 is indicated by four dotted circles 127, 128, 129 and 130 which represent the field of view of detection assembly 110 at successive quarter cycles of nutation. Due to the nutation of the detection assembly 110, only images of objects in area 131 will exist in their entirety throughout a nutation cycle. The center of the field of view will move on an ellipse indicated at 132. Obviously, all of the dotted lines indicated in FIG. 9 are actually circles when viewed along the reference axis 121, but they are drawn as ellipses due to the perspective view taken.

From the foregoing explanation, it will be understood that all radiant energy transmitted to detection assembly 110 will be chopped. As explained previously, only the energy received in the area of circle 131 will be received all the time during the one complete cycle of nutation. This means that all radiant energy received through the areas of the instantaneous imaged fields of view 127, 128, 129 and 130 not common with the circle 131 will vary with time. Thus, if the background is not uniform, scanning noise of the same frequency as the cyclic nutation frequency will be created which will make it more difficut to distinguish a target signal at maximum range. The prior art system shown in FIG. 9 also suffers from several other disadvantages. In the first place, due to the fact that the instantaneous field of view is moved during tracking, the minimum resolution of the radiant energy collection apparatus employed therewith will vary with nutational position. That is, aberration caused by the use of mirrors or lenses necessarily causes the size to which an image of the target may be resolved to change with the nutational position of detection assembly 110. This is also another source of undesirable scanning noise during tracking. The maximum resolution of any radiant energy detection system employing mirrors or lenses at a maximum range is called the blur circle size. Thus, to state this same disadvantage another way, the blur circle size varies with the distance $r$ of airplane 120 from axis of nutation 121. Still further, this change in size means that a single reticle of a given aperture width cannot optimize space frequency reinforcement since effective target size or blur circle size will change during the nutation of tracking with prior art apparatus.

The large size of the detection assembly 110 shown in FIG. 9 requires relatively large component parts for structural rigidity. Still further, a relatively large amount of electrical power must be employed to nutate the detection assembly 110.

The output of frequency discriminator 123 will not be a linear representation of the angular position of airplane 120 represented by the angle between a line through airplane 120 and the gimbal center of detection assembly 110 and the axis of nutation 121. This is true because chopping action obviously does not take place during a portion of the nutation cycle when airplane 120 falls outside of circle 131.

All the above-described disadvantages of the prior art are overcome by the present invention by employing a detection assembly of the general form indicated in FIG. 10. This embodiment of the invention comprises optical collection apparatus 73 having an optical axis 72. Optical collection apparatus 73 projects an imaged field of view upon a reticle 69, the imaged field of view being indicated at 52'. An integrating lens element 77 collects energy passed by the reticle 69 and directs this energy to a sensitive cell 78. The output terminal of the cell is designated 79. The reticle 69 is adapted to be spun about its axis 67 by means of a spin drive motor 70.

In accordance with the present invention, the spin drive motor 70, whose shaft is connected to the axis of reticle 69, is adapted to be drivingly positioned around a closed path surrounding the optical axis 72. To this end, the spin drive motor 70 is mounted on a tubular member 95 to which is attached a drive gear 96. An actuating gear 97, attached to the shaft of a planetary drive motor 98, engages the drive gear 96 so as to permit the spin drive motor 70, and hence, the axis 67 of the reticle, to be positioned at any point along the dotted line path X. A drive power supply 102 impresses a control voltage on planetary drive motor 98. Similarly, a spin drive power supply 102' is connected to spin drive motor 70. The output of spin drive power supply 102, is coupled to spin drive motor 70 through a slip ring and brush assembly, whose components are generally indicated by reference numeral 108. In order to obtain a reference signal input for phase comparator 119 and frequency discriminator 123 of FIG. 9, a reference signal generator 103 shown in FIG. 10 may be provided. Reference signal generator 103 is mechanically coupled by means of a gear 104 to the actuating gear 97. The output signal of reference signal generator 103 may be alternating signal of a frequency equal to the cyclic frequency of movement of tubular member 95 through 360 mechanical degrees.

Optical collection apparatus 73 may be conventional and is indicated in FIG. 11. The general form of optical system shown in FIG. 11 is commonly called a Cassegrain optical mirror system. It incorporates a frustoconical frame structure 21C in which primary and secondary mirrors 22C and 23C are mounted. Infrared radiation is reflected from mirror 22C to 23C and then into an aperture in a reticle assembly 16C. Collection apparatus 73 is hinged at 24C to gimbals 25C, which have illustratively been broken away for clarity.

Figure 12:
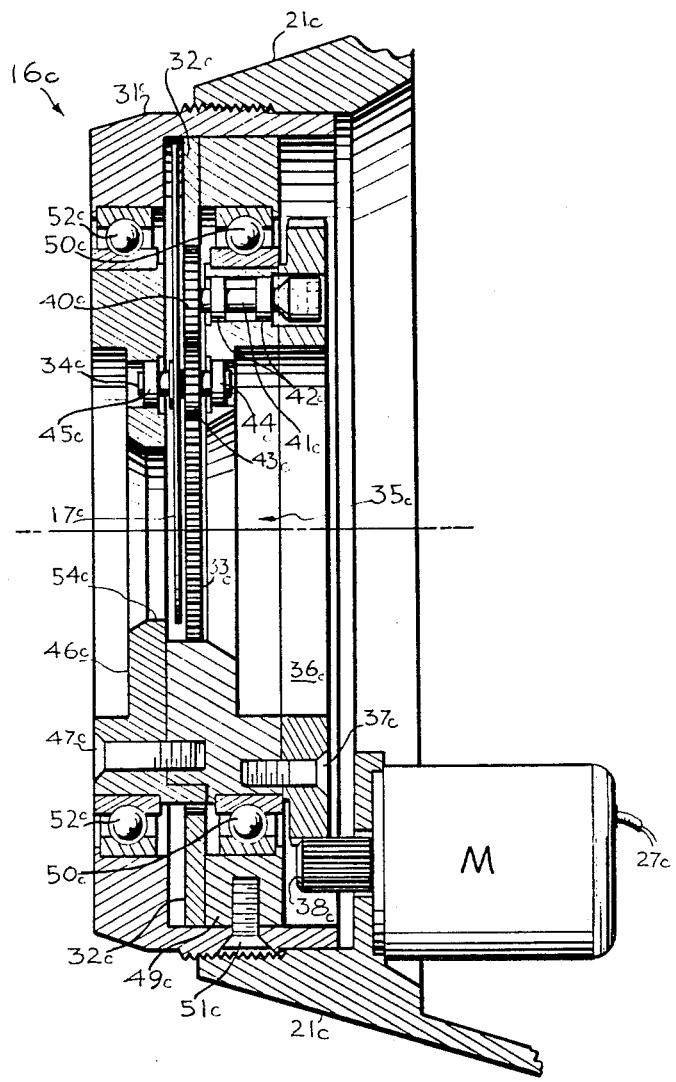
FIG. 12 is a sectional view of an alternative embodiment of the invention.

Reticle assembly 16C, shown in more detail in FIG. 12, may incorporate a reticle 17C which may be driven by a motor M that is maintained in a fixed position relative to framework 21C. Motor M is provided with electrical leads 27C. A light baffle 28C (FIG. 11) is located in the center of secondary mirror 23C to prevent infrared radiation from entering an aperture in the forward portion of reticle assembly 16C with the exception of infrared radiation reflected from secondary mirror 23C. An infrared cell, not shown, is located in a Dewar flask 29C in which it is cooled. The output of the cell is converted into an amplified electrical signal which is impressed upon output leads 30C.

A mechanical drive including motor M which may be maintained in a fixed position relative to a reticle housing 31C and framework 21C is shown in FIG. 12. Similarly, an internal gear wheel 32C may also be maintained in a fixed position relative to housing 31C, gear wheel 32C being annular in shape and having radial teeth 33C extending inwardly.

Reticle 17C is provided with a shaft 34C about which it is rotated. This shaft is rotatably mounted in a reticle supporting body 35C to which a gear 36C is fixed by means of screws 37C. Gear 36C is driven by a pinion 38C fixed to the drive shaft of motor M. An idler gear 40C is mounted on a shaft 41C which is rotatably mounted in reticle supporting body 35C. Shaft 41C is rotatably mounted in reticle support member 35C in bearings 42C. Idler gear 40C has teeth to mesh with both the teeth of gear wheel 32C and a gear 43C which is rotatably mounted on shaft 34C that is journaled in bearings 44C and 45C. Reticle supporting body 35C is then fixed to a field stop 46C by means of screws 47C. Shaft 34C is, of course, fixed to reticle 17C, as stated previously, and movement of gear 43C therefore rotates reticle 17C about the axis of shaft 34C. However, movement of gear 36C also produces movement of the axis of shaft 34C about the optical axis of the system. By use of the idler gear 40C, the axis of shaft 34C is rotated about the center of the imaged field of view in the same direction that reticle 17C itself rotates about the axis of shaft 34C.

Reticle support member 35C is rotatably mounted in an annular ring 49C on ball bearings 50C, rings 49C being maintained in a fixed position relative to housing 31C by means of screws 51C. Similarly, field stop 46C is rotatably mounted in housing 31C on ball bearings 52C.

Figure 13:
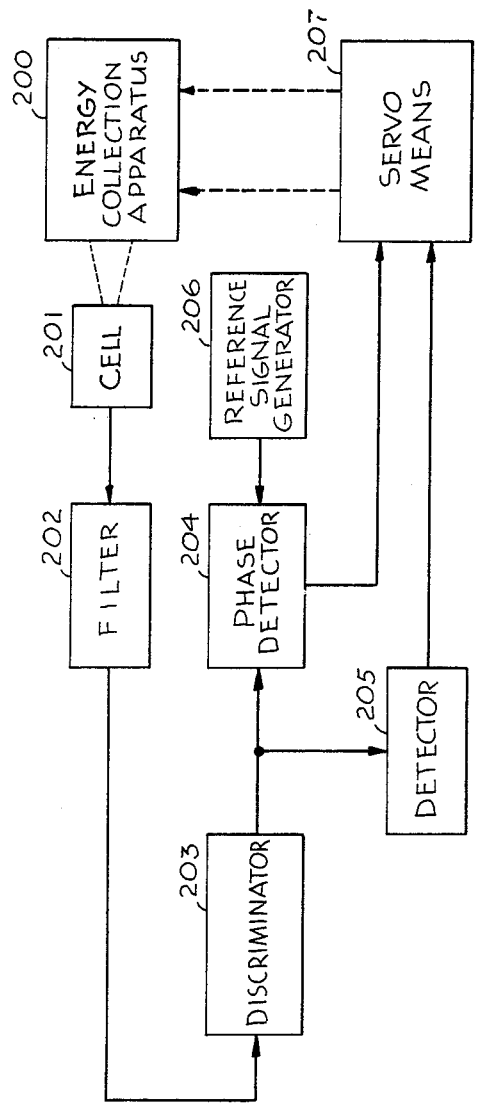
FIG. 13 is a block diagram of a radiant energy detection system incorporating the invention.

In FIG. 13 the manner in which the reticle assembly is incorporated in a radiant energy search system is illustrated including radiant energy collection apparatus 200, a radiant energy sensitive cell 201 to receive energy collected by the apparatus 200, a filter 202 to receive the output signal of cell 201, and a discriminator 203 to receive the output signal of filter 202. Discriminator 203 impresses its output signal both on a phase detector 204 and an amplitude detector 205. Phase detector 204 also receives an input signal from a reference signal generator 206. Phase detector then impresses an output signal upon servo means 207 which also receives an output signal from detector 205. Servo means 207 controls the position of energy collection apparatus 200.

As explained previously in connection with FIG. 9, frequency discriminator 122 produces an output signal $r$ proportional to the distance indicated at $r$ from the origin O to the airplane 20 in an imaged field of view on the reticle employed in energy collection apparatus 200. Phase detector 204 produces an output signal $\theta$ proportional to the angular position of the image of the aircraft 120 on the reticle employed in energy collection apparatus 200. The outputs of both phase detector 204 and amplitude detector 205 are therefore direct-current voltages which may be amplified, if desired, and impressed on a resolver to convert the polar coordinates $r$ and $\theta$ into Cartesian coordinates. Azimuth and elevation drive motors may then be operated to correct the respective azimuth and elevation orientation of energy collection apparatus 200 so that the image of airplane 120 on the reticle therein is at the center of the circular field of view. From the foregoing, it will be appreciated that all that is necessary to be included in servo means 207 is a resolver and azimuth and elevation drive motors illustrated diagrammatically in the prior art FIG. 9 as azimuth drive 115 and elevation drive 112 respectively. Servo means 207 may be of the simplest servo type and need not even require any azimuth data or elevation data pick-off such as the data pick-offs 117 and 114, respectively, shown in the prior art FIG. 9, because when an image of the aircraft 120 on the reticle and energy collection apparatus 200 is at the center of the circular field of view thereon, the outputs of phase detector 204 and amplitude detector 205 will become zero and the azimuth and elevation drive motors no longer will be operated to change the position of energy collection apparatus 200.

Energy collection apparatus 200 may be identical to the collection apparatus 73 shown in FIG. 11. Radiant energy sensitive cell 201 and reference signal generator 206 may be identical to cell 78 and generator 103 shown in FIG. 10. It is to be noted that cell 201 and reference signal generator 206 will be mechanically mounted on the structure of energy collection apparatus 200, the same being shown separately in FIG. 13 where input signals to filter 202 and phase detector 204 initiate. Filter 202 is a carrier frequency filter which may be identical to the filters illustrated at 44 in FIG. 5 and at 122 in FIG. 9. Discriminator 203 may be identical to frequency discriminator illustrated at 123 in FIG. 9. Phase detector 204 may be identical to phase comparator 119 illustrated in FIG. 9. Amplitude detector 205 may be simply a diode detector. In regard to FIG. 13 in general, it is to be noted that each and every one of the component parts or circuits illustrated therein may be entirely conventional with the exception of energy collection apparatus 200 which incorporates the specific reticle position and drive arrangement in accordance with the invention. In this same regard, either the arrangement of the invention shown in FIG. 10 or the arrangement of the invention shown in FIG. 12 may be employed, the difference between the same being that spin drive motor 102′ is provided in addition to planetary drive motor 98 shown in FIG. 10 whereas a single drive motor M is provided in FIG. 12 incorporating a planetary like gear system not only to rotate reticle 17C about its axis of symmetry, but also to cause its axis of symmetry to describe a cylinder.

From the foregoing, it will be appreciated that the output of phase detector 204 will be a direct-current voltage proportional to the angular position $\theta$ indicated in FIG. 9 in connection with the position of airplane 120 on the reticle of the invention and the output of amplitude detector 205 will be a direct-current voltage proportional to the distance from the origin O to the image of the airplane 20 on the reticle of the invention. The azimuth and elevation drive motors are then operated from a resolver to change polar coordinates $r$ and $\theta$ to Cartesian coordinates to reposition energy collection apparatus 200 until the image of the airplane is on the origin, that is, at the center of the circular field of view on the reticle of the invention.

As probably already is apparent, the use of the terminology to describe movement of the reticle of the invention in the image field as scanning the image of the field of view "in substantially the same direction" refers generically not only to the movement of reticle of the type 37 illustrated in FIG. 4, but also of the type illustrated at 69 in FIG. 10 and refers to the fact that the transparent and opaque areas of the reticle, at least in part, move completely out of and back into the area of the field of view for example illustrated at 52′ in FIG. 10. Thus, the terminology describing a reticle movement with the areas scanning the image of the field of view "in substantially the same direction" distinguish over the prior art embodiment illustrated in FIG. 5 where above a horizontal line through the origin 67 of the field of view 48 moves to the right and the reticle below a horizontal line through the origin 67 moves to the left when the reticle 49 is rotated to the right as viewed in FIG. 5.

The reticle employed with the invention may be the conventional spoke-type reticle as described previously. However, due to the fact that imaged field of view may be projected on a conventional spoke-type reticle in accordance with the invention near the periphery thereof, if the diameter of the imaged field of view projected thereon is rather small in comparison to the diameter of the reticle, it will be appreciated that the variation in width of transparent reticle apertures passing through the imaged field of view may be very small.

From the foregoing, it will be appreciated that the method and apparatus of the invention provide means for improved space filtering. Due to the fact that, in accordance with the invention, the imaged field of view may be projected onto a reticle at a position near the periphery thereof spaced a substantial distance from the center, the aperture width variation with radius on the reticle within the imaged field of view will be substantially smaller than in apparatus of the prior art wherein the imaged field of view is located at the symmetrical center of the reticle.

Thus, space filtering is improved both in searching and in tracking operations. In search only, the Doppler frequency shift effect of prior art apparatus is substantially reduced by the present invention due to the fact that all the reticle apertures pass through the imaged field of view, in accordance with the invention, in substantially the same direction. In search, it is contemplated that the periodic planetary translation of the reticle axis be suspended as by conditionally withholding the application of power to the planetary drive motor 98 in FIG. 10. The arrangement of FIG. 12 is, of course, primarily useful in track.

It is also an outstanding feature of the invention that tracking may be performed with the optical axis maintained substantially stationary. That is, nutation is not required. Due to the fact that the optical axis is substantially stationary, blur circle size will not change rapidly or substantially during tracking because when nutation is avoided in accordance with the invention, a target is not viewed at different angles through the optical collection apparatus. Scanning noise is not encountered since nutation or scanning is not performed in the tracking operation of the present invention. Still further, the linearity of the output signal is improved since a target cannot fall outside the field of view of the apparatus as with periodic nutation.

Since nutation is avoided, it is also unnecessary to mechanically move the detection assembly equipment rapidly and hence the advantages of lighter structure having less rigid load requirements may be employed and this structure may be moved with a substantially less electrical power. It is to be noted that in manual or automatic tracking, the detection assembly of the invention will, of course, be moved to track a target. However, this movement will be substantially slower than the tracking nutation movement of the apparatus of the prior art.

What is claimed is:

In an electro-optical system for determining the position of a source of radiant energy, said system having means for collecting a portion of energy radiated from said source and a cell positioned on the optical axis of the collection means for producing an electrical signal proportional to the intensity of radiant energy projected thereon by said collection means, the combination comprising: a disc-shaped reticle disposed between said collection means and said cell, said reticle including spaced bodies of relative opacity to radiant energy, said reticle being positioned to interrupt radiant energy projected onto the cell by rotation thereof such that all of said bodies pass substantially in the same direction through the path of radiant energy, said bodies having the shape of radial spokes extending approximately from the center of said reticle to the border thereof; first power means for rotating said reticle about its symmetrical axis at a substantially constant speed; second power means for translating the position of the axis of said reticle in a circle around the optical axis of said collection means at a substantially constant radius from the optical axis of said collection means; said reticle being both rotated about its axis and translated about the optical axis of said collection means simultaneously; filter means connected to said cell for deriving an alternating signal of a frequency dependent upon the relative speeds of rotation and translation of said reticle; a reference signal generator for producing an alternating signal having a period equal to the time during which said reticle is translated once around the optical axis of said collection means by said second power means; a discriminator for detecting the frequency modulation of the output of said filter means; a comparator producing an output signal proportional to the difference between the phases of the output signals of said reference signal generator and said discriminator; a detector for producing an output signal proportional to the amplitude of said discriminator output signal; and servo means responsive to the output of said comparator and said detector for positioning said collection means at an angle such that the optical axis thereof is directed toward a target received by said system.

References Cited by the Examiner

UNITED STATES PATENTS

| | | | |
|---|---|---|---|
| 1,122,924 | 12/1914 | Henderson | 74—785 |
| 1,626,719 | 5/1927 | Callison | 74—785 |
| 2,421,012 | 5/1947 | Chew | 244—14.3 |
| 2,431,510 | 11/1947 | Salinger | 244—14.3 |
| 2,878,396 | 3/1959 | Behm et al. | 88—1 |
| 2,892,124 | 6/1959 | Rabinow | 250—233 X |
| 2,905,828 | 9/1959 | O'Maley | 88—1 |
| 2,906,883 | 9/1959 | Hansen | 244—14.3 |
| 2,942,118 | 6/1960 | Gedance | 244—14.3 |
| 2,949,672 | 8/1960 | Ostergren | 250—233 |
| 2,981,842 | 4/1961 | Kaufold | 250—83.3 |
| 2,981,843 | 4/1961 | Hansen | 250—203 |
| 3,134,022 | 5/1964 | Jones et al. | 250—203 X |
| 3,143,654 | 8/1964 | Aroyan et al. | 250—203 X |

FOREIGN PATENTS 68,298   11/1957   France.

RALPH G. NILSON, *Primary Examiner.*

CHESTER L. JUSTUS, M. R. WILBUR, *Examiners.*

D. G. BREKKE, R. A. FARLEY, W. STOLWEIN,
*Assistant Examiners.*